Oct. 29, 1946.   B. M. HARRISON   2,410,066
SUBMARINE SIGNALING
Filed Nov. 11, 1937   2 Sheets-Sheet 1
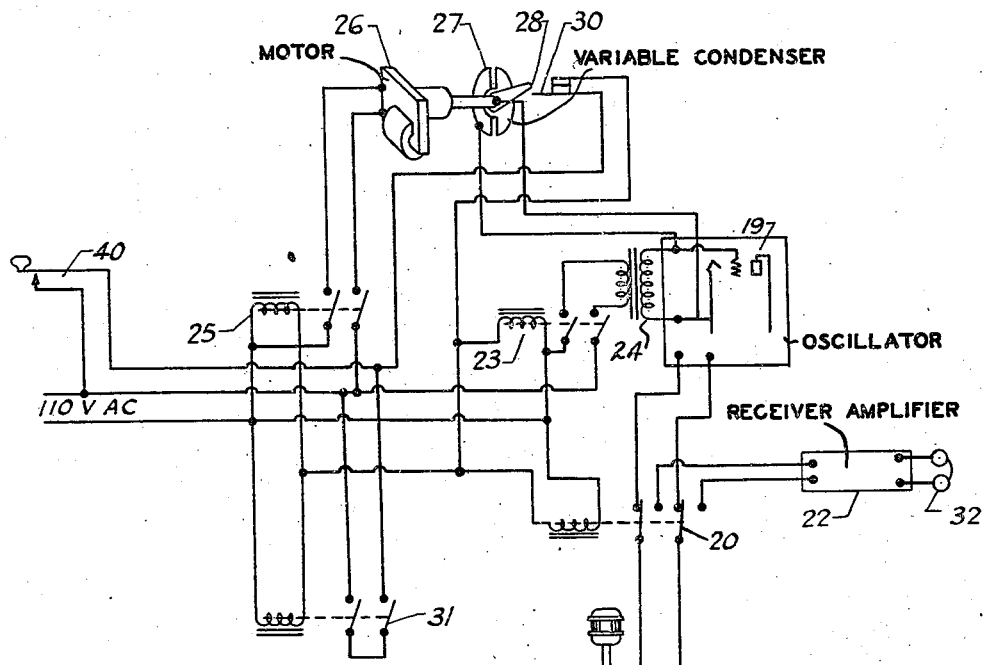
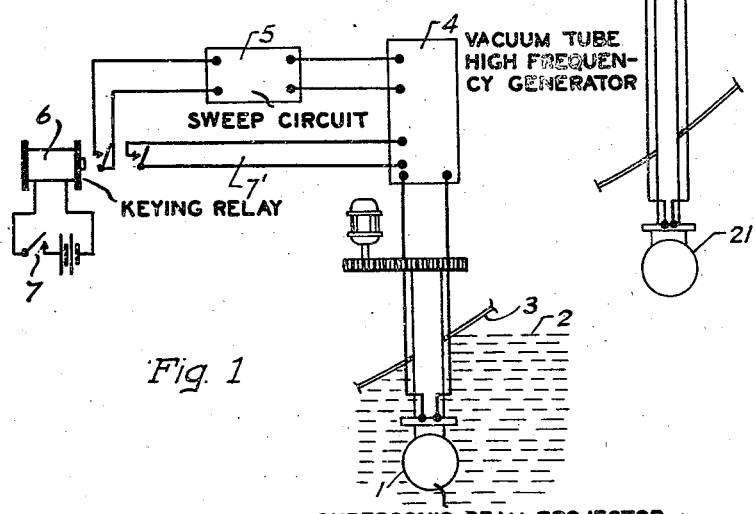
INVENTOR.
BERTRAM M. HARRISON
BY
ATTORNEY.

Oct. 29, 1946.    B. M. HARRISON    2,410,066
SUBMARINE SIGNALING
Filed Nov. 11, 1937    2 Sheets-Sheet 2
Fig. 3
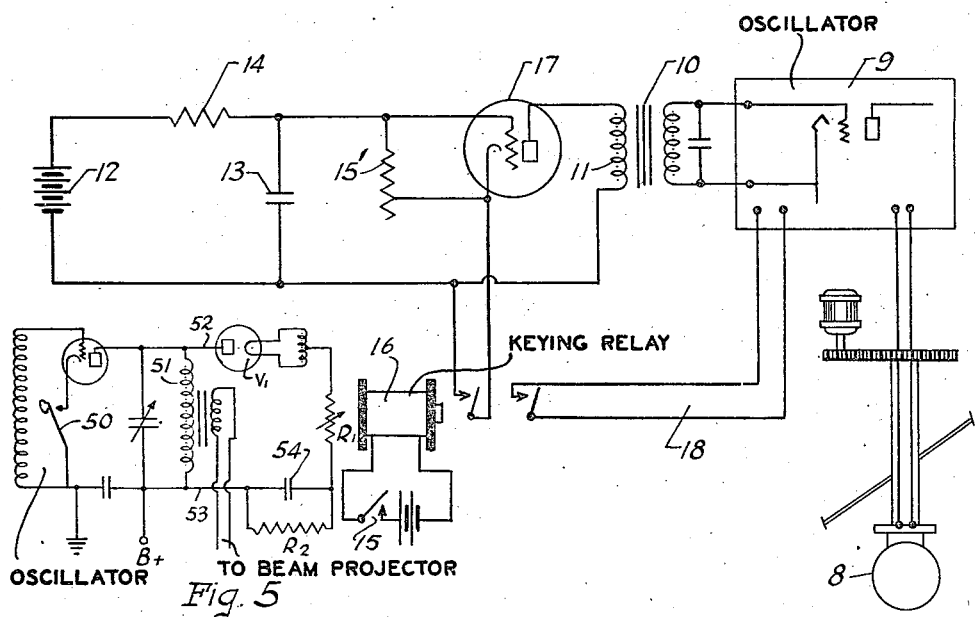
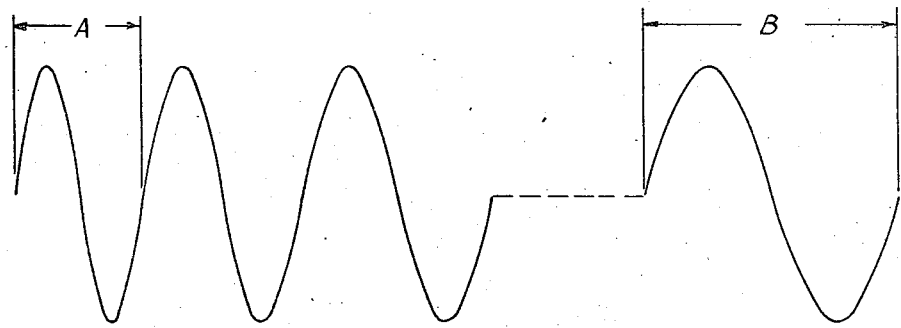
Fig. 2
INVENTOR.
BERTRAM M. HARRISON
BY
ATTORNEY.

Patented Oct. 29, 1946

2,410,066

UNITED STATES PATENT OFFICE 2,410,066

SUBMARINE SIGNALING

Bertram M. Harrison, Newton Highlands, Mass., assignor, by mesne assignments, to Submarine Signal Company, Boston, Mass., a corporation of Delaware Application November 11, 1937, Serial No. 174,081

15 Claims. (Cl. 177—386)

1

The present invention relates to a method and apparatus for sound ranging and more particularly for sound ranging by use of signaling under water.

In the ordinary method of sound ranging a projector capable of projecting a beam of supersonic sound in the water is used to detect the presence of objects in the water. Usually in this method the projector is held stationary for the time interval that the signal is being emitted and kept in this position until the time within which a reflection should have been received from the object if an object were present within the searching range. The projector may then be rotated to another direction and a similar observation is made.

Signals of various lengths are used, depending upon the distance of the sound ranging intended. The signal must, of course, be shorter in length than it takes for the sound to travel to the object and return to the receiver or projector if the projector is used as a receiver. For instance, if the objects to be observed are at a distance of 5,000 feet, then the signal must be shorter than two seconds since if this is not the case, the signal will be sent while the echo is returning. As a matter of fact, the signal used should be shorter than the time interval for sound to travel the closest range and return to be observed.

When no other reflecting surfaces are present in the propagating medium other than that from which a reflection is desired, the echo from the object giving the reflection will be very sharp and distinctive. However, when reflecting surfaces are present, which is practically always the case, various other reflections are returned to the transmitter and receiver which are apt to hinder the identification of the echo being observed and sometimes even make it difficult to observe the echo distinctly.

In the usual case of sound ranging reflecting surfaces are present at almost all distances, reflections being produced by the uneven water surfaces at the top of the water, by the bottom and also by any change in the medium itself. These reflecting surfaces usually produce a reverberation of echoes which may begin immediately after the signal has ended and continue even through the receipt of the reflected echo to be observed. At times there may be a discontinuity in the reverberation as where there is a lack of reflecting surfaces to produce an echo during the time of observation. However, for the most part the reverberations in the usual

2 manner of sound ranging are present practically at all times and seriously interfere with the identification of the echo from the object which it is desired to observe.

In the present method of sound ranging the reverberations are diminished to a great extent and their character is so modified that there is little difficulty in identifying a signal from the object observed. In accomplishing this result the applicant has observed that the reverberations produced in sound ranging are caused for the most part by small reflecting surfaces. The high frequency sound beam that is emitted is confined for the most part to a horizontal direction and therefore hits the reflecting surfaces at the top and at the bottom of the water at such an inclination that only a small amount of energy is reflected back. The sound energy, however, returned to the receiver or projector tends to be cumulative in the operation of the receiving units so that even though these reflecting surfaces are small and produce little reflective energy, their cumulative effect is such as to seriously interfere with the more intense echo from the object to be observed. This, in fact, becomes of considerable importance when it is realized that increasing the sound energy does not greatly increase the signaling range. In fact, doubling the sound energy hardly gives a noticeable increase in sound ranging. This can be easily shown by observation and by mathematical proof.

In the present invention the effect of interfering reverberation is overcome by choice of the particular type of signal used for transmitting which, of course, affects the signal presented for reception. In the present invention the signal used is varied in frequency gradually throughout the whole length of the signal, substantially over the range of maximum resonance of the system. If the peak resonance of the projector and receiver, or the projector alone when it is used as a receiver, is between 22 and 24 kilocycles, then the variation in frequency over the entire signal will occur substantially between these frequencies. This will provide the maximum sensitivity of the receiving system. However, it is not necessary for the method employed to hold to any given frequency range and any continuous variation in signal frequency might be employed which is suitable for the apparatus that is being used. In employing a signal which varies in frequency continuously from its beginning to the end, the waves sent out through the propagating medium are always different from the waves about to follow so that from the minor reflecting surfaces, echoes having frequencies all different from one another at all times are produced which results in echoes of very low intensity at the receiver. In fact, the signals from different reflecting surfaces arriving at different times or even at the same time by shorter paths are out of phase in such fashion that the reverberations are practically eliminated. The effect is even more startling under actual tests than what would seem possible theoretically. While the echoes from the small reflected surfaces are practically eliminated, those from the object to be observed as, for instance, a keel of a vessel or a submerged submarine or a large reflecting rock, are not greatly reduced in intensity and further are provided with a characteristic response that in itself does not produce continued ringing of the receiving system.

The invention will be more fully understood in connection with the drawings illustrating an embodiment of the invention in which Fig. 1 shows schematically the apparatus and circuits employed and illustrates the operation and use of the method of the present invention; Fig. 2 is a curve showing the kind of signal produced; Fig. 3 is a more detailed modified circuit of the type shown in Fig. 1; Fig. 4 and Fig. 5 are further modifications of the circuit shown in Fig. 3.

In the drawings 1 illustrates a projector for projecting a beam of supersonic energy into a water medium 2. The projector may be projected through the skin 3 of a vessel and be controlled and rotated from the inside by any suitable control and rotating mechanism. The projector itself may have a large radiating area and radiate compressional waves of a supersonic frequency whereby the waves radiated will be sent out as a beam of compressional wave energy. Preferably the projector 1 is excited by an electric frequency generating source 4 capable of producing continuous electrical vibratory energy at the desired frequency. The electric frequency generating source is preferably a vacuum tube oscillatory circuit in which the frequency may be controlled within the desired range but any other suitable type of electric frequency generating source may be used. It is preferable to be able to vary the frequency of the generating source 4 over a range substantially 10% of the mean frequency generated so that if the frequency to be generated is approximately 20 kilocycles, the range would preferably be 1 or 2 kilocycles margin either way. The range is not particularly critical providing the generating source is capable of responding equally well over the entire range of frequencies. The variation in frequency of the source 4 is controlled by the frequency change or sweep circuit 5 which may be of the type shown either in Fig. 3 or Fig. 4. The sweep circuit or frequency changer is preferably controlled by the keying relay 6 which may be operated by the key 7. The keying relay also operates the frequency source 4 through the leads 7' simultaneously with the control of the sweep circuit so that as the signal is being sent out, its frequency is constantly changing.

As has been mentioned above, a sweep circuit of the type illustrated in Fig. 3 may be employed. In this figure the projector 8 is operated through the vacuum tube generator 9 whose frequency is controlled by the coupling transformer 10 which preferably may be connected to the input of the frequency generating circuit. The coupling transformer 10 has a secondary 11 in the sweep circuit in such a manner that the resistance across the secondary is continually and progressively changing throughout the keying interval. In this circuit a battery 12 continually charges a condenser 13 through a resistance 14 except at times when the key 15 is closed whereupon the condenser 13 discharges through the resistance 15' and the keying relay 16, the voltage produced across the resistance 15' being such as to vary the conductivity of the tube 17 in a continuous fashion until the condenser 13 has been discharged to such a voltage that the potential in the circuit including the battery 12, the resistance 14 and the condenser 13 is balanced. The variation in the conductivity of the tube 17 varies the load on the transformer 10 and in this way its inductance and frequency of the generator 9. The variation in control may be such as to vary progressively the frequency generated by the source 9 as much as 2,000 or more cycles when the source 9 is normally being driven around 22,000 cycles. The keying relay 16 also controls the closing of the generating circuit through the connections 18 from the keying relay to the generating circuit simultaneously with the discharge of the resistance 15'.

In the arrangement illustrated in Fig. 4 the connection to a receiving amplifier is shown. In any of the systems which are used it is necessary either to produce a visual indication or to convert the high frequencies so that the signal and echo may be heard as an audible note. This may be accomplished either by having a receiver amplifier permanently connected in the projector circuit or the receiver amplifier may be connected to the projector as the listening device after the signal has been emitted. It is also possible to use a separate receiver or pickup device or a second projector not in any way connected with the projector which is sending out the signal. In either case the system of operation and the method employed is the same. The power source or power oscillator 19 operates the projector 21 through the projector transfer relay 20 when the transfer switch is thrown to the left, while when the transfer switch 20 is thrown to the right, the projector 21 is connected with the receiver amplifier 22. The power relay 23, when operated, closes the input of power to the generating circuit through the transformer 24, while the motor relay 25 simultaneously controls the variation of the keying signal through the motor relay 25 and motor 26. The motor 26 drives a variable condenser 27 which is in the input of the generating circuit and through which the frequency of the generating circuit is controlled over the desired range. The condenser 27 is provided with an arm 28 and as this arm rotates and comes to the end of its turn, a switch 30 is opened which shuts off the entire system. Initially the closing of the key 40 operates the entire system and simultaneously operates the interlocking switch 31, the transfer relay 20, the motor relay 25 and the power relay 23.

The type of signal employed is shown in Fig. 2. In this case the initial vibration A may be sinusoidal and have a frequency of 24 kilocycles while the final vibration B which may occur approximately at $\frac{1}{10}$ of a second later may have a frequency of 22 kilocycles. Other ranges of frequencies may be employed.

In the present system the operation is as follows: The listener turns the projector in the desired direction and transmits the signal by pressing the key 40 in the system. The signal sent out gradually changes in frequency from an initial frequency, for instance at 22 kilocycles to a final frequency at 24 kilocycles, the signal being of the length particularly desired which is usually 1/10 of a second or less. The projector is maintained in the same position until various echoes are observed. The reverberations from local objects due to the varying frequencies will be practically obliterated whereas the reflection from the object to be observed will come in as a distinctive echo at a frequency varying similarly as the frequency of the direct signal. For a receiving circuit any well-known type of amplifier may be used and the amplifier may be connected through some heterodyne device for producing audible signals in a pair of telephones 32, Fig. 4, or a loud speaker or the circuit may be connected to some indicating device to indicate visually the signal and also to measure the time interval in order to give an indication of the distance. In the latter case the signal should be emitted synchronously with a zero position on the indicator and the indicator should rotate at a speed to produce measurements of the distance or time interval travelled by the signal in its path to the reflecting object and return.

The further sweep circuit which has been usefully employed in the present invention is illustrated in Fig. 5. In this case the oscillator is keyed by means of the key 50, thus impressing high frequency from the tank circuit coil 51 across the terminals of the sweep circuit 52, 53. These are rectified through the rectifier tube V1 and impressed upon the condenser 54 as rectified alternating current. This, however, is to effect a partial short circuit of the oscillator at the beginning of the signal which is gradually cleared as the condenser becomes charged and the impedance of the sweep circuit is raised, the final impedance being the value of the resistors R1 and R2 in series. The oscillator circuit has a frequency at any moment dependent upon the capacity of the condenser C, the inductance 51 and the impedance of the other elements in the circuit. The change in the impedance of the circuit caused by the charging of the condenser 54 causes a progressive change in the frequency of the oscillator, producing the sweep frequency signal. When the key is opened, the condenser 54 which has been charged begins to discharge through the resistance R2 and by the time the key 50 is closed again, the condenser 54 has been fully discharged and ready for a repetition of the operation. In the circuit according to this figure the key 50 remains closed for the period of the signal.

Having now described my invention, I claim:

1. A method of sound ranging under water with the use of a high frequency beam projector which comprises sending out a signal of supersonic compressional waves varying progressively in frequency from the beginning to the end of the signal over a frequency range comparatively small with respect to the supersonic frequency and having a predetermined time length less than twice the time of travel of the waves from the projector to an object whose range is being determined and observing the echo reflected from the objects in the path of the beam.

2. A method of sound ranging under water with the use of a high frequency compressional wave projector which comprises sending out supersonic waves in signals of a time length less than twice the time of travel of the waves from the projector to an object whose range is being determined and wherein the frequency of the waves progressively varies from the beginning to the end of the signal and observing the reflections from objects in the path of the signal emitted.

3. In a system for sound ranging, in combination, a projector adapted to project a beam of supersonic sound waves, an electric frequency generating source connected therewith for operating the same at a supersonic frequency and means for operating said source to emit a supersonic signal varying progressively over a narrow band of frequencies and having a predetermined time length less than twice the time of travel of the waves from the projector to an object whose range is being determined.

4. In a system for sound ranging, in combination, a projector adapted to project a beam of supersonic sound waves, an electric frequency generating source connected therewith for operating the same at a supersonic frequency and a control circuit for controlling the frequency of said source including an inductance connected therein adapted to be varied in magnitude by the current therethrough and means for varying the current passed through said inductance comprising a thermionic tube connected in circuit therewith and means for varying the conductivity of the thermionic tube associated therewith.

5. In a system for sound ranging, in combination, a projector adapted to project a beam of supersonic sound waves, an electric frequency generating source connected therewith for operating the same at a supersonic frequency having connected therewith an impedance the variation of which varies said supersonic frequency, a control circuit for varying said frequency comprising a vacuum tube circuit having across the input thereof means for varying the conductivity of the tube progressively during the length of the signal and thereby varying said impedance and means electrically connecting said impedance in control circuit with said source whereby the frequency of said source is varied progressively during the signal transmission.

6. In a system for sound ranging, in combination, a projector adapted to project a beam of supersonic sound waves, an electric frequency generating source connected therewith for operating the same at a supersonic frequency, a control circuit comprising a vacuum tube having a cathode, anode and a control grid with an input for said grid having a condenser discharge circuit, keying means for effecting the discharge of said circuit to control the signal production, and means operative in the cathode-anode circuit of said vacuum tube circuit and electrically connected to said source whereby the discharge of said condenser operating through said control circuit varies the frequency of said source progressively over the time of the signal emission.

7. In a system for sound ranging, in combination, a projector adapted to project a beam of supersonic sound waves, an electric frequency generating source connected therewith for operating the same at a supersonic frequency, a control device for producing a progressive variation in the frequency of said source during the period of signal output the duration of which is less than twice the time of travel of the waves from the projector to the object whose range is being determined, and a keying device operatively associated with both said control device and said source to commence the operation of both simultaneously.

8. In a system for sound ranging, in combination, a projector adapted to project a beam of supersonic sound waves, an electric frequency generating source connected therewith for operating the same at a supersonic frequency, a control device comprising a motor and a variable condenser driven thereby, said condenser being electrically connected to said source for producing a progressive variation in the frequency of the electric generating frequency circuit during the period of the signal impulse the duration of which is less than twice the time of travel of the waves from the projector to the object whose range is being determined and a keying device operatively associated with both said control device and said source to commence the operation of both simultaneously.

9. A method of sound ranging under water with the use of a projector capable of emitting a beam of high frequency compressional waves which comprises facing the projector in the direction in which the ranging is to be made and causing the projector to emit a signal of said high frequency compressional waves progressively varying in frequency from the beginning to the end of the signal, said signal having a time length which is substantially less than the time of travel of the waves from the projector to the reflecting object and return.

10. In a system for sound ranging, in combination, a projector adapted to project a beam of supersonic sound waves, an electric frequency generating source connected therewith for operating the same at a supersonic frequency, a control device for producing a progressive variation in the frequency of said source circuit during the period of signal output the duration of which is less than twice the time of travel of the waves from the projector to the object whose range is being determined, and a keying device operatively associated with both said control device and said source to commence and to stop the operation of both simultaneously.

11. In a system for sound ranging having a projector for producing compressional waves, means for energizing the projector to produce an impulse the duration of which is less than twice the time of travel of the waves from the projector to the object whose range is being determined, comprising an alternating current source and electrically operated means for continuouly varying the frequency of said source within predetermined frequency limits.

12. In a system for sound ranging having a projector for producing compressional waves, means for energizing the projector comprising an alternating current source, electrically operated means for continuously varying the frequency of said source within predetermined frequency limits and means for simultaneously applying said source to said projector and initiating operation of said frequency varying means.

13. In a system for sound ranging having a projector for producing compressional waves, means for energizing the projector including an ocillator tube, means for continuously varying the frequency of the oscillator within predetermined limits and means for simultaneously applying the oscillator output to said projector and initiating the operation of said frequency varying means.

14. In a system for sound ranging having a projector for producing compressional waves, means for energizing the projector including a thermionic tube oscillator circuit having an oscillator tube and an anode potential supply therefor, means in said circuit for continuously varying the frequency of said oscillator within predetermined limits and means for simultaneously applying said anode potential to said oscillator tube and initiating the operation of said frequency varying means.

15. In a system for sound ranging having a projector for producing compressional waves, means for energizing the projector comprising a normally inactive alternating current source, means for continuously varying the frequency of said source and means for periodically activating said source and simultaneously initiating operation of said frequency varying means.

BERTRAM M. HARRISON.